(12) United States Patent
Im et al.

(10) Patent No.: US 7,450,173 B2
(45) Date of Patent: Nov. 11, 2008

(54) SLIDING-TYPE PORTABLE DIGITAL COMMUNICATION APPARATUS

(75) Inventors: Jung-Hyeok Im, Seongnam-si (KR); Chang-Soo Lee, Incheon (KR); In-Gon Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 600 days.

(21) Appl. No.: 10/921,622

(22) Filed: Aug. 19, 2004

(65) Prior Publication Data

US 2005/0070344 A1 Mar. 31, 2005

(30) Foreign Application Priority Data

Sep. 30, 2003 (KR) ...................... 10-2003-0067888

(51) Int. Cl.
*H04N 5/225* (2006.01)
(52) U.S. Cl. .................. 348/373; 348/333.01; 348/335; 348/376; 455/575.4
(58) Field of Classification Search ................ 348/335, 348/368, 369, 373–375; 455/575.4
See application file for complete search history.

(56) References Cited

U.S. PATENT DOCUMENTS

2004/0012701 A1* 1/2004 Nagai et al. ............ 348/333.12
2004/0204202 A1* 10/2004 Shimamura et al. ...... 455/575.1
2005/0049019 A1* 3/2005 Lee ........................ 455/575.4
2005/0083642 A1* 4/2005 Senpuku et al. ............. 361/681
2005/0099533 A1* 5/2005 Matsuda et al. ............. 348/375
2005/0168628 A1* 8/2005 Wang et al. ................. 348/375

* cited by examiner

*Primary Examiner*—Lin Ye
*Assistant Examiner*—Gevell Selby
(74) *Attorney, Agent, or Firm*—The Farrell Law Firm, PC

(57) ABSTRACT

A sliding-type portable communication apparatus includes a body housing; a sliding housing sliding on an upper surface of the body housing while being in contact with the body housing; first and second angled housings, each of the first angled housings extending from one corner of one side of the body housing in an inclined direction gradually going far from a lower surface of the sliding housing, each of the second angled housing having a first surface and a second surface, the first surface being in contact with the first angled housing while extending in the inclined direction, and the second surface being opposite to the first surface and in contact with the sliding housing; a pair of connecting arms, each of which extends from an end of one of the second angled housings in the inclined direction; and a rotatable lens housing disposed between the connecting arms and having a camera lens, the camera lens being oriented in a direction passing through the lower surface of the sliding housing when the sliding housing has not been moved a predetermined distance, and the camera lens being oriented in a direction passing through the upper surface of the body housing when the sliding housing has been moved.

9 Claims, 6 Drawing Sheets

SLIDING-TYPE PORTABLE DIGITAL COMMUNICATION APPARATUS

PRIORITY

This application claims priority to an application entitled "Sliding-type portable digital communication apparatus" filed with the Korean Industrial Property Office on Sep. 30, 2003 and assigned Ser. No. 2003-67888, the contents of which are hereby incorporated herein by reference.

BACKGROUND OF THE INVENTION

1. Field of the Invention

The present invention relates to portable digital communication apparatuses, such as cellular phones, PDAs (personal digital assistants), HHPs (hand held phones), and PCS (personal communication service) phones, and more particularly to sliding-type portable digital communication apparatuses, which can be conveniently used in an image communication or taking a picture of a subject.

2. Description of the Related Art

In general, a "portable communication apparatus" means an electronic apparatus which a user can carry with him/her to perform wireless communication with a partner. In consideration of portability, designs of such portable communication apparatuses have tended not only toward compactness, slimness, and lightness, but also toward multimedia availability, having a wider variety of functions. In particular, future portable communication apparatuses are not only expected to pursue greater multi-functionality and multi-purpose utilization, and greater compactness and lightness, but also these apparatuses will be modified to be suitable for various multimedia environments or Internet environments. Additionally, such portable communication apparatuses are now commonly used by all kinds of people, including men and women, the young and the old throughout the world, and are recognized by some people as a nearly indispensable commodity which should be always carried.

Conventional portable communication apparatuses may be classified in various types according to their appearance, such as bar-type portable communication apparatuses, flip-type portable communication apparatuses, and folder-type portable communication apparatuses. The bar-type portable communication apparatus has a single housing shaped like a bar. The flip-type portable communication apparatus has a flip which is pivotally mounted to a bar-shaped housing by a hinge unit. The folder-type portable communication apparatus has a folder coupled to a single bar-shaped housing by a hinge unit in such a manner that the folder can be rotated in order to be folded to or unfolded from the housing.

Further, the portable communication apparatuses may be classified in neck wearable type communication apparatuses and wrist wearable type communication apparatuses according to the position at or the way in which a user puts on the communication apparatus. The neck wearable type communication apparatus is one which a user wears around the neck using a string, while the wrist wearable type communication apparatus is one which a user wears around the wrist.

Additionally, the portable communication apparatuses may be classified into rotation-type communication apparatuses and sliding-type communication apparatuses according to a manner of opening and closing the communication apparatuses. In the rotation-type portable communication apparatus, two housings are coupled to each other in such a manner that one housing rotates to be opened or closed relative to the other. In the sliding-type portable communication apparatus, two housings are coupled to each other in a manner that one housing slides to be opened or closed relative to the other. These variously classified portable communication apparatuses can be easily understood by those skilled in the art.

In addition to the portable communication apparatuses as described above, headphone type portable communication apparatuses or eyeglasses type portable communication apparatuses, which a user can wear on his or her body, are expected to appear in the near future.

Meanwhile, conventional portable communication apparatuses now tend to have a function of transmitting data at a high speed in addition to the basic function of performing voice communication. In other words, according to an increased demand by consumers, portable communication apparatuses now tend to provide a service using a wireless communication technology capable of transmitting data at a high speed. Recent portable communication apparatuses tend to be equipped with a camera lens which enables each of the communication apparatuses to transmit an image signal. In other words, current conventional portable communication apparatuses may have an imbedded or external camera lens or a photographing means enabling a user to make an image communication with a partner or to take a photograph of a subject.

However, in the conventional sliding-type portable communication apparatuses, each having an embedded camera lens module, the lens module is fixed to a body housing or a sliding housing, which makes it inconvenient for a user to take a photograph of a subject. In some cases, a user cannot help changing his or her pose or position in order to obtain the desired photographs of a subject with the conventional apparatus. Meanwhile, in the case of conventional portable communication apparatuses each having a separate external camera lens module, there is a high possibility that the camera lens module may be lost.

SUMMARY OF THE INVENTION

Accordingly, the present invention has been made to solve the above-mentioned problems occurring in the prior art, and an object of the present invention is to provide a sliding-type portable digital communication apparatus, which can be conveniently used for taking a photograph.

It is another object of the present invention to provide a sliding-type portable digital communication apparatus, in which a camera lens housing automatically rotates according to sliding of a sliding housing and a camera lens in a body housing is oriented in a direction passing through the lower surface of the sliding housing when the sliding housing has been slid in a first direction relative to the body housing, and in a direction passing through the upper surface of the body housing when the sliding housing has been slid in a direction opposite to the first one, so that it is very convenient to use the sliding-type portable digital communication apparatus.

In order to accomplish these objects, there is provided a sliding-type portable communication apparatus comprising: a body housing; a sliding housing sliding atop the body housing while in contact there with; first and second angled housings, each of the first angled housings extending from one corner of one side of the body housing in an inclined direction gradually going far from the lower surface of the sliding housing, each of the second angled housings having a first surface and a second surface, the first surface being in contact with the first angled housing while extending in the inclined direction, and the second surface being opposite to the first surface and in contact with the sliding housing; a pair of connecting arms, each of which extends from an end of one of the second angled housings in the inclined direction; and a rotatable lens housing disposed between the connecting arms and having a camera lens, the camera lens being oriented in a direction passing through the lower surface of the sliding housing when the sliding housing has not been moved along a predetermined distance, and the camera lens being oriented in a direction passing through the upper surface of the body housing when the sliding housing has been moved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may make the subject matter of the present invention rather unclear.

Figure 1:
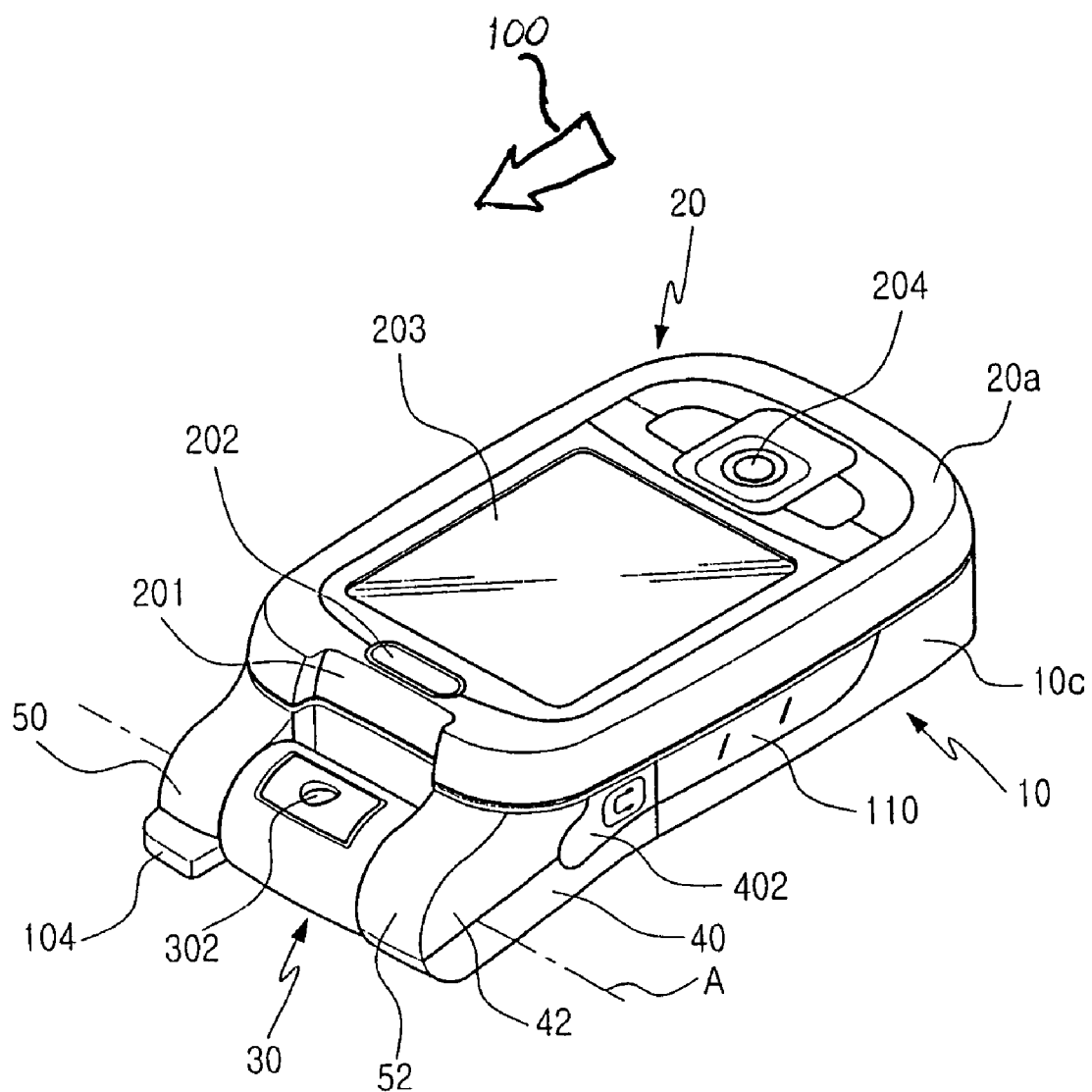
FIG. 1 is a perspective view of a sliding-type portable digital communication apparatus according to a preferred embodiment of the present invention.

As shown in FIGS. 1 through 6, a portable digital communication apparatus according to a preferred embodiment of the present invention includes a body housing 10, a sliding housing 20 sliding on an upper surface 10a (FIG. 3) of the body housing 10 in a longitudinal direction of the apparatus, angled housings 40 and 42 extending from two corners of one side of the body housing 10 in an inclined direction with respect to the body housing 10, a pair of connecting arms 50 and 52 extending in the inclined direction in which the angled housings 40 and 42 extend, and a rotatable lens housing 30 disposed between the connecting arms 50 and 52 in such a manner that the rotatable lens housing 30 can rotate about a hinge axis A (FIG. 1). Not only the sliding housing 20 slides linearly along a path, but also the angled housings lie in a plane extending substantially parallel to the linear path. Further, the inclined direction signifies a direction in which the angled housings 40, 42 linearly and angularly extend from a lower surface 20b (FIG. 4) of the sliding housing 20.

Figure 2:
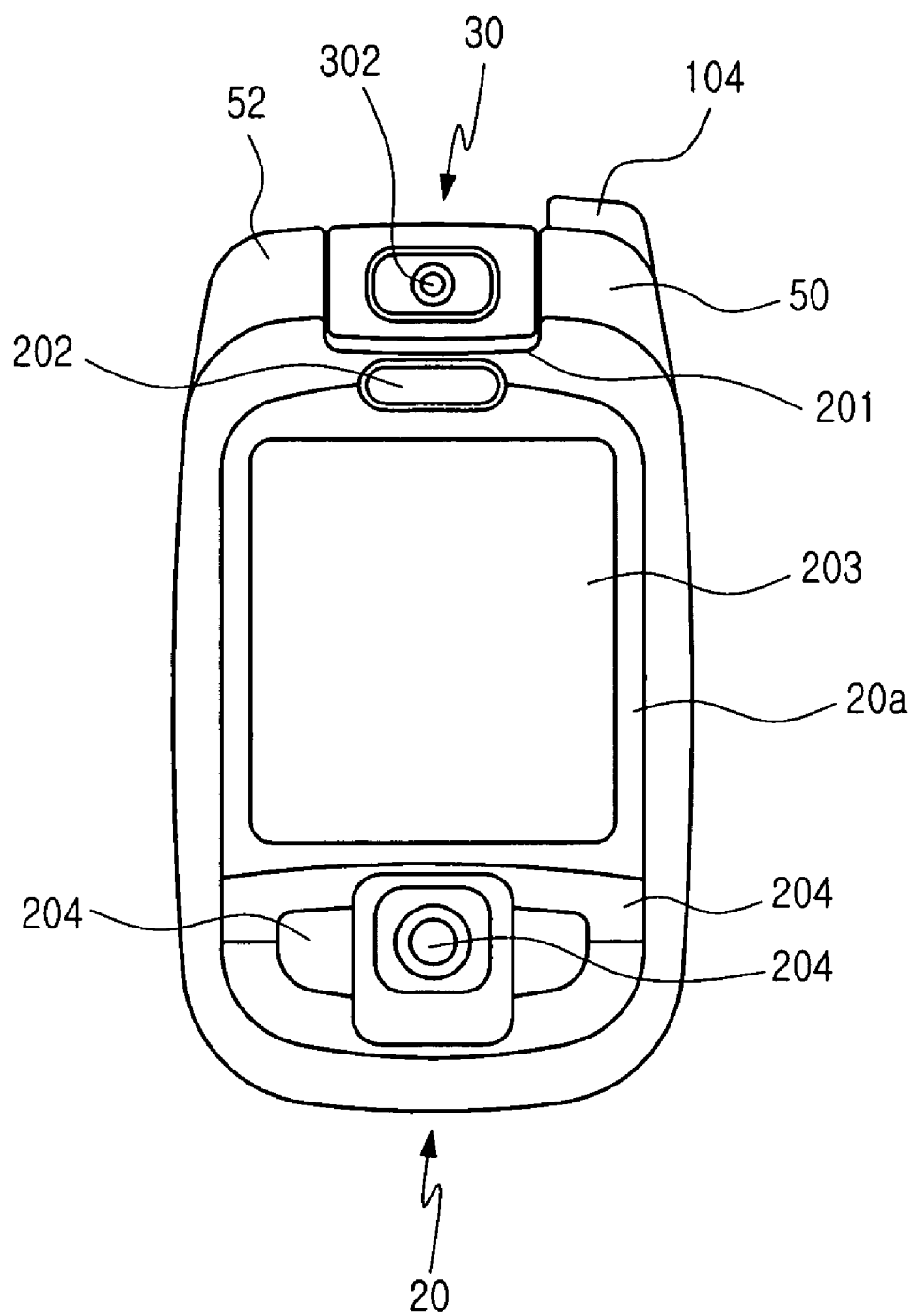
FIG. 2 is a front view of the portable digital communication apparatus shown in FIG. 1.
Figure 3:
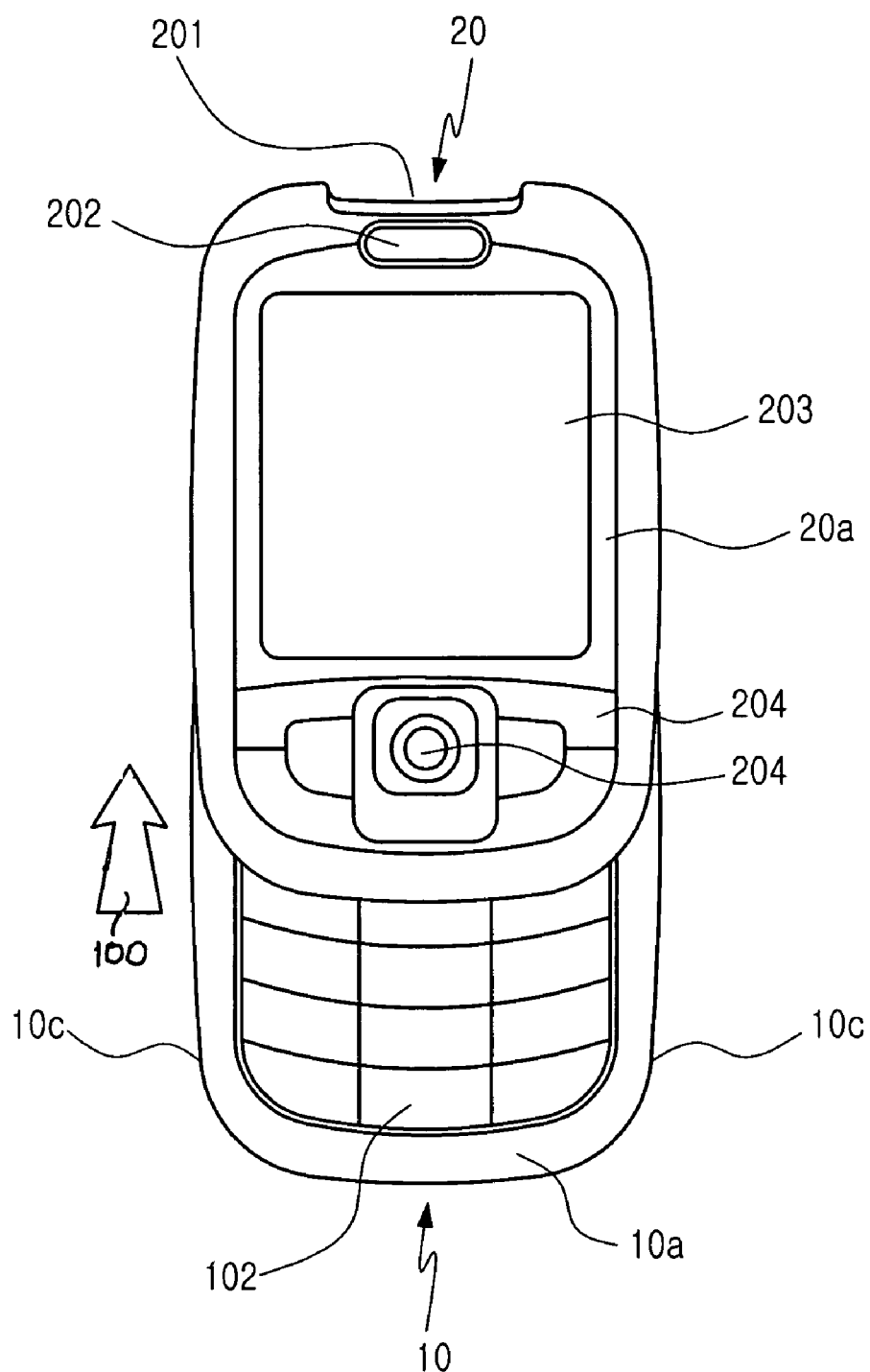
FIG. 3 is front view of the portable digital communication apparatus shown in FIG. 1, in which a sliding housing of the apparatus has been slid open.
Figure 4:
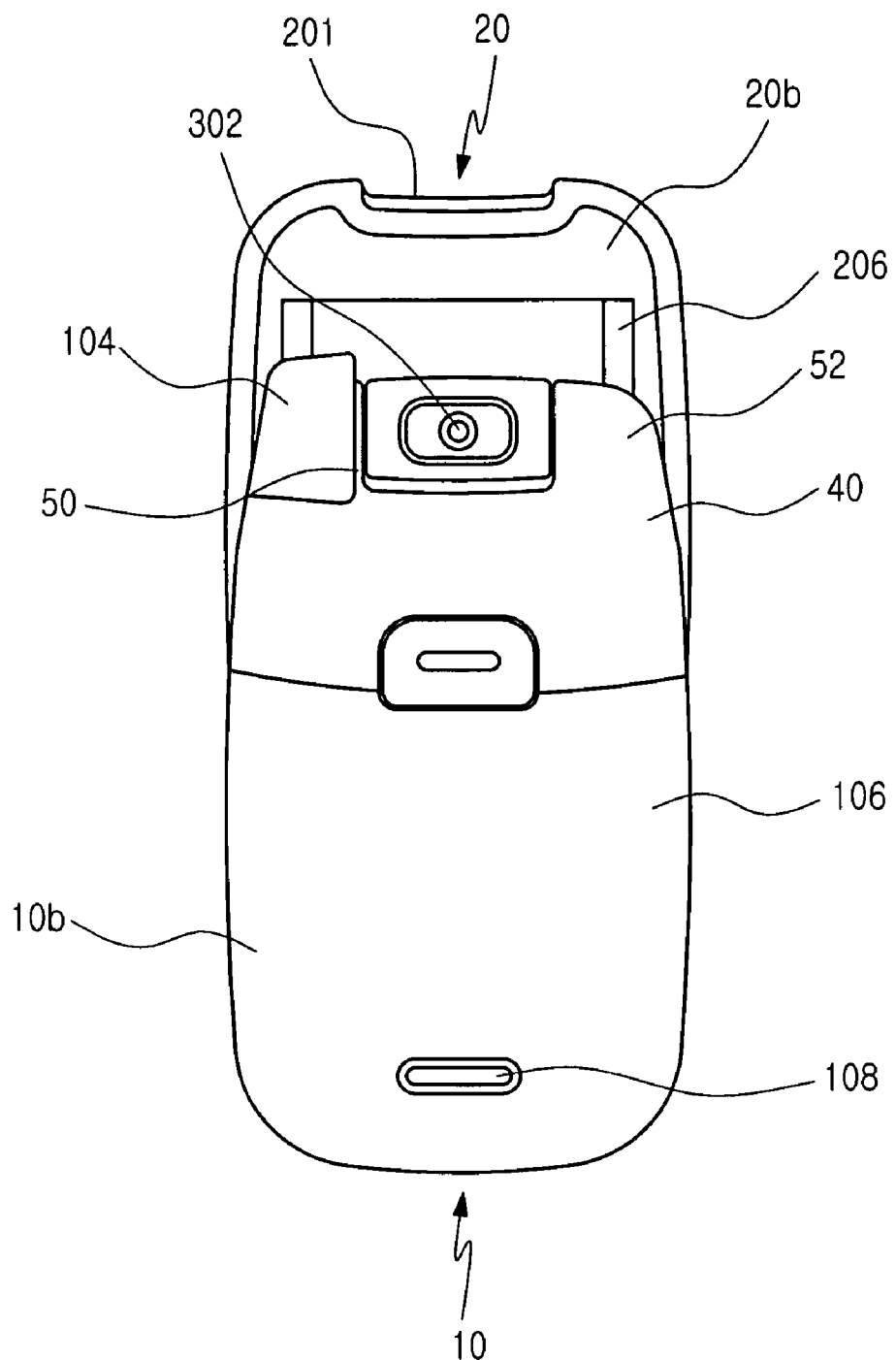
FIG. 4 is a rear view of the portable digital communication apparatus shown in FIG. 3.

Referring to FIGS. 1, 3 and 4, the body housing 10 has the upper surface 10a, a lower surface 10b, and side surfaces 10c. The upper surface 10a has a first key array 102 (FIG. 3) including a plurality of keys arranged on the upper surface 10a, which is exposed when the sliding housing 20 has been slid open in a direction defined by an arrow 100 (FIGS. 1 and 3). The key array 102 is hidden when the sliding housing 20 is not moved and is maintained in a closed state of this housing as illustrated in FIGS. 1 and 2. A battery 106 (FIG. 4) and a battery-charging terminal 108 are disposed on the lower surface 10b of the body housing 10. The battery 106 is detachably mounted to the lower surface 10b of the body housing 10. A second key array 110 (FIG. 1) including a plurality of keys is disposed on one of the side surfaces 10c of the body housing 10.

Figure 5:
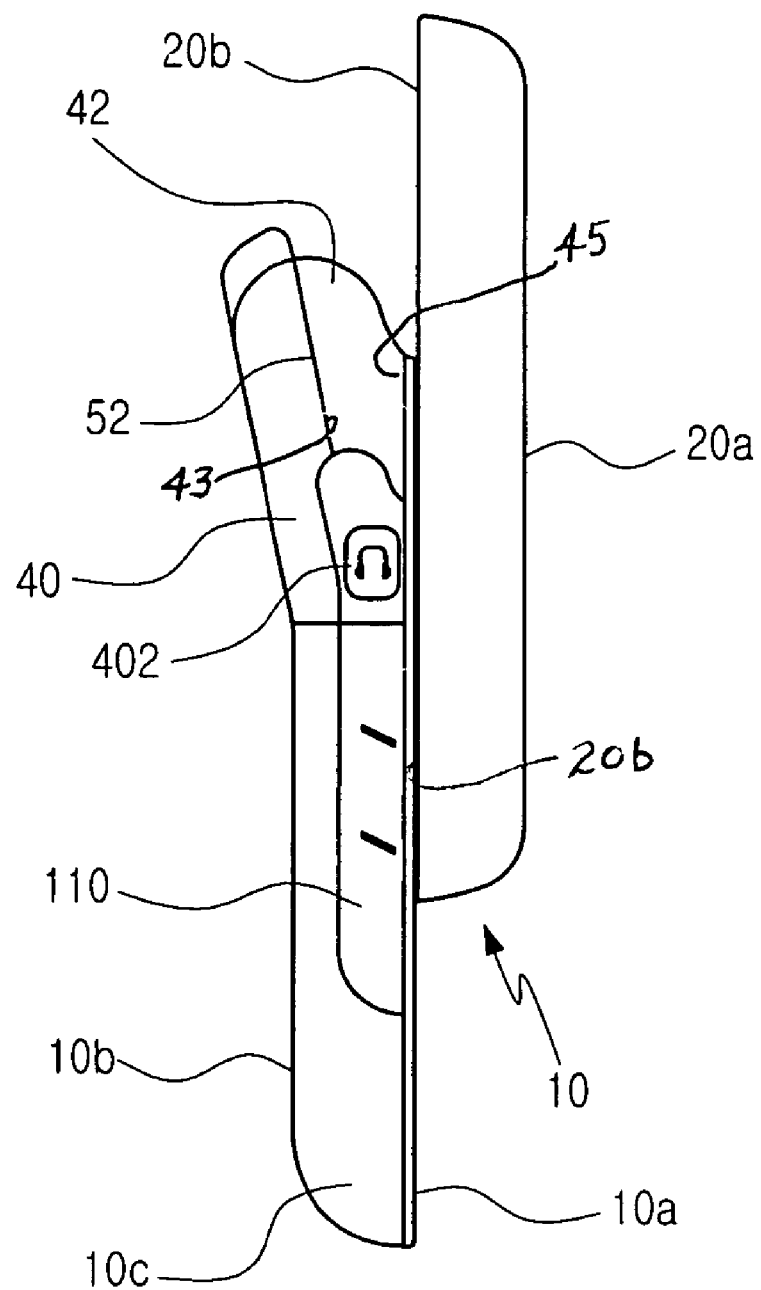
FIG. 5 is a left side view of the portable digital communication apparatus shown in FIG. 3.

The sliding housing 20 has an upper surface 20a (FIGS. 1 and 3) and a lower surface 20b (FIGS. 4 and 5). A lens opening 201 (FIGS. 1-4) having a predetermined shape is formed at a distal end of the upper surface 20a, a speaker unit 202 is disposed adjacent to the lens opening 201, a display unit 203 is disposed adjacent to the speaker unit 202, and a third key array 204 including a plurality of keys is disposed adjacent to the display unit 203. The display unit 203 may employ an LCD module, a touch screen, or a hologram screen. The lens opening 201 is configured so that the rotatable lens housing 30 (FIGS. 1, 2) is completely exposed when the sliding housing 20 is in the closed state relative to the body housing 10, as illustrated in FIGS. 1 and 3.

Figure 6:
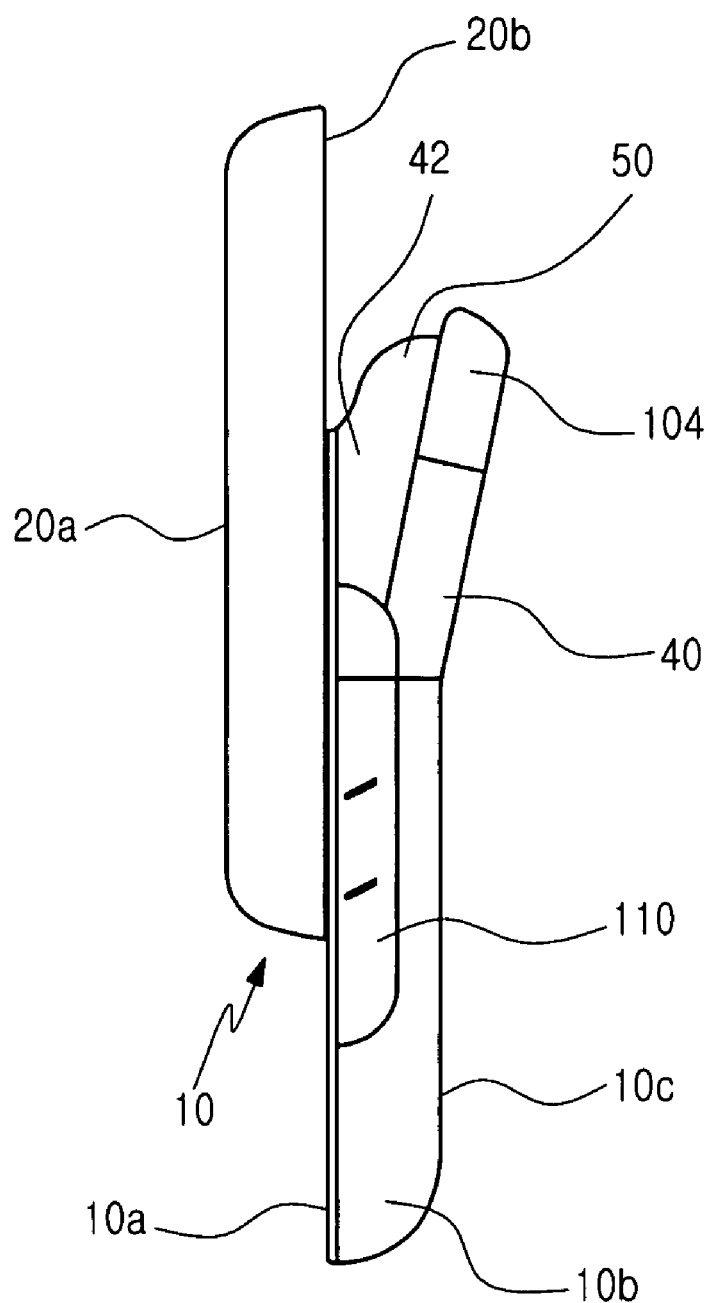
FIG. 6 is a right side view of the portable digital communication apparatus shown in FIG. 3.

Referring to FIGS. 5 and 6, each of the first angled housing 40 extends outwards from a respective corner of the distal end of the body housing 10 in an inclined direction. Accordingly, the distal end of the first angled housing 40 is spaced from the lower surface 20b of the sliding housing 20 at a distance greater than its proximal end. The second angled housing 42 has a first surface 43 (FIG. 5), which is in contact with the first angled housing 40 while extending in the inclined direction, and a second surface 45, which is opposite to the first surface and in contact with the sliding housing 20.

A pair of spaced apart connecting arms 50 and 52 each are formed integrally with a respective one of the second angled housings 42 and extend angularly downwards from the second surface 45 towards the first surface 43.

An antenna unit 104 (FIGS. 1, 2) is assembled with one of the connecting arms 50 and 52. The antenna unit 104 also extends in the inclined direction with respect to the lower surface 20b (FIG. 5) of the sliding housing 20.

The rotatable lens housing 30 (FIG. 1) is rotatably disposed between the connecting arms 50 and 52. When the sliding housing 20 has been moved at a predetermined distance to its open state, as shown in FIGS. 3 and 4, the rotatable lens housing 30 allows a camera lens 302 to be oriented so that it faces away from the lower surface 20b of the sliding housing 20 as shown in FIG. 4. Further, when the sliding housing 20 is in its closed state (FIGS. 1 and 2), the camera lens 302 faces towards the lower surface 20b of the sliding housing 20 as shown in FIGS. 1 and 2. Further, the rotatable lens housing 30 has a cylindrical shape.

Of course, the rotatable lens housing 30 may be rotated either semi-automatically or automatically. Although not shown, a conventional motor and a reduction module for reducing a speed of the motor may be provided to constitute a power source for automatically rotating the rotatable lens housing 30. Otherwise, a conventional rack and a conventional pinion may be used to constitute a power source for semi-automatically rotating the rotatable lens housing 30, so as to enable the rotatable lens housing 30 to rotate according to the movement of the sliding housing 20. It is preferred that the rotatable lens housing 30 cooperates with the sliding housing 20, and that the rotatable lens housing 30 is oriented in a direction passing through the upper surface 10a of the body housing 10 when the sliding housing 20 is slid up to its open state, as illustrated in FIGS. 3 and 4.

Moreover, the movement of the sliding housing 20 may be sensed by a sensor (not shown), and the rotation of the rotatable lens housing 30 may be automatically controlled according to a sensing signal of the sensor. A commonly used magnetic sensor, hole sensor, approach sensor, etc., may be used as the sensor described above. That is, whether to rotate the rotatable lens housing 30 or not will be determined according to whether the sliding housing 20 has slid or not, or whether the sliding housing 20 has approached the rotatable lens housing 30 or not. Also, the rotatable lens housing 30 can be rotated within a predetermined range of about 180°.

Preferably, the direction in which the sliding housing 20 slides is perpendicular to the hinge axis A (FIG. 1) for the rotatable lens housing 30, and the direction in which the first and second angled housings 40 and 42 are inclined is perpendicular to the hinge axis A for the rotatable lens housing 30. Further, the connecting arms 50 and 52 are apart from the lower surface 20b of the sliding housing 20, and the rotatable lens housing 30 also is apart from the lower surface 20b of the sliding housing 20.

In a state as shown in FIG. 1, a user can conveniently make an image communication with a partner, since the camera lens 302 faces the user in the closed state of the sliding housing 20. In contrast, in the open state of the sliding housing 20, as shown in FIGS. 3 and 4, a user can conveniently take a desired photograph of a subject, since the camera lens 302 is oriented in a direction opposite to the user operating, for example, the first key array 102.

As described above, a portable communication apparatus according to the present invention includes a camera leans in a rotatable lens housing, which automatically rotates to be oriented in a direction enabling the camera lens to conveniently take a photograph of a subject. Therefore, it is convenient to use a portable communication apparatus according to the present invention.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding-type portable communication apparatus comprising:
    a body housing;
    a sliding housing sliding on an upper surface of the body housing while being in contact with the body housing;
    a pair of first and a pair of second angled housings, each of the first angled housings extending from one corner of one side of the body housing in an inclined direction away from a lower surface of the sliding housing, each of the second angled housing having a first surface and a second surface, the first surface being in contact with the first angled housings while extending in the inclined direction, and the second surface being opposite to the first surface and in contact with the sliding housing;
    a pair of connecting arms each extending from a respective end of one of the second angled housings in the inclined direction; and
    a rotatable lens housing disposed between the pair of connecting arms and having a camera lens, the camera lens being oriented in a direction passing through the lower surface of the sliding housing when the sliding housing has not been moved relative to the body housing, and the camera lens being oriented in a direction passing through the upper surface of the body housing when the sliding housing has been moved at a predetermined distance relative to the body housing.

2. A sliding-type portable communication apparatus as claimed in claim 1, wherein the sliding housing slides along a linear path and the first and second angled housings lie in a plane extending parallel to the linear path.

3. A sliding-type portable communication apparatus as claimed in claim 1, wherein the body housing includes a first key array and a second key array, the first key array including a plurality of keys arranged on the upper surface of the body housing and being exposed when the sliding housing has been moved and hidden when the sliding housing has not been moved, the second key array including a plurality of keys arranged on a side surface of the body housing.

4. A sliding-type portable communication apparatus as claimed in claim 1, wherein the sliding housing has a lens opening extending from an upper surface of the sliding housing towards the lower surface thereof, a speaker unit disposed adjacent to the lens opening, a display unit disposed adjacent to the speaker unit, and a third key array disposed adjacent to the display unit, the third key array including a plurality of keys.

5. A sliding-type portable communication apparatus as claimed in claim 1, wherein the sliding housing slides in a direction perpendicular to a hinge axis of the rotatable lens housing.

6. A sliding-type portable communication apparatus as claimed in claim 1, wherein an antenna unit extends in the inclined direction in which the angled housings extend.

7. A sliding-type portable communication apparatus as claimed in claim 1, wherein the rotatable lens housing and the connecting arms are spaced from the lower surface of the sliding housing.

8. A sliding-type portable communication apparatus comprising:
    a body housing and a sliding housing coupled to and slidable relative to one another between a closed and open state of the sliding housing;
    a pair of spaced first angled housings each extending angularly outwards from a distal side of the body housing and spaced from the sliding housing;
    a pair of spaced second angled housings each located between the sliding housing and a respective one of the pair of first angled housings so that opposite first and second surfaces of each second angled housing are in contact with the first angled housing and the sliding housing, respectively;
    a pair of spaced connecting arms each extending angularly between the first and second surfaces of each second angled housing; and
    a lens housing provided with a camera lens, the lens housing extending between and mounted rotatably to the pair of connecting arms to rotate between a first position, in which the camera lens faces away from the body housing in the closed state of the sliding housing, and a second position, in which the camera lens faces towards the body housing in the open state of the sliding housing.

9. A sliding-type portable communication apparatus, comprising:
    a first and second housings coupled to and slidable relative to one another between an open state and a closed state, the second housing having a display unit facing a first direction; and
    a lens housing provided with a camera lens and rotatably mounted to an end of the first housing so that at the closed state, the lens housing is completely exposed and the camera lens faces in the first direction, and when the first and second housings are sliding to the open state, the sliding to the open state controls rotation of the lens housing to position the camera lens to face in a second direction being opposite to the first direction.

* * * * *